US007408940B2

(12) United States Patent
Jin et al.

(10) Patent No.: US 7,408,940 B2
(45) Date of Patent: *Aug. 5, 2008

(54) USE OF PRECEDENCE BITS FOR QUALITY OF SERVICE

(75) Inventors: Jane Jiaying Jin, San Jose, CA (US); Jie Chu, Los Altos, CA (US); Maria Alice Dos Santos, Redwood City, CA (US); Shuxian Lou, San Jose, CA (US); Shujin Zhang, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 519 days.

This patent is subject to a terminal disclaimer.

(21) Appl. No.: 11/024,589

(22) Filed: Dec. 28, 2004

(65) Prior Publication Data

US 2005/0111360 A1    May 26, 2005

Related U.S. Application Data

(63) Continuation of application No. 09/215,630, filed on Dec. 16, 1998, now Pat. No. 6,917,617.

(51) Int. Cl.
*H04L 12/54* (2006.01)
(52) U.S. Cl. .................................. 370/395.21; 709/223
(58) Field of Classification Search ................. 370/230, 370/389, 391, 395, 400, 401, 398.2; 709/220, 709/223
See application file for complete search history.

(56) References Cited

U.S. PATENT DOCUMENTS 4,499,576 A    2/1985  Fraser .......................... 370/60

(Continued)

FOREIGN PATENT DOCUMENTS

WO    99/53408    10/1999

OTHER PUBLICATIONS

Zhang et al., "Rate-Controlled Static-Priority Queueing", Feb. 1992, Computer Science Division University of California at Berkley, pp. 1-13.

*Primary Examiner*—Chi Pham
*Assistant Examiner*—Phuc Tran
(74) *Attorney, Agent, or Firm*—Thelen Reid Brown Raysman & Steiner LLP

(57) ABSTRACT

Certain bits of a packet, such as bits in the IP header of an IP packet, are used to designate the type of service or Quality of Service (QoS) level to be afforded to the packet as it passes through a data communications network. A user entitled to a certain QoS level logs into a service selection gateway SSG. The SSG queries an authentication, authorization and accounting (AAA) server in response to a log-in attempt by the user. Upon authorization, the AAA server returns an access accept signal in addition to an indication from the user's service profile (user profile) as to the QoS level to be afforded the user. While the user is logged in, all packets are routed through the SSG. The SSG sets the certain bits of the packet in accordance with the user's assigned QoS level so that as the packets are routed through the data communications network, they are consistently afforded the assigned Quality of Service level. In another aspect of the invention, on-demand QoS may be provided by the SSG and accounted for by communications with the AAA server.

87 Claims, 3 Drawing Sheets

U.S. PATENT DOCUMENTS

| | | | |
|---|---|---|---|
| 4,769,810 A | 9/1988 | Eckberg, Jr. et al. | 370/60 |
| 4,769,811 A | 9/1988 | Eckberg, Jr. et al. | 370/60 |
| 5,224,099 A | 6/1993 | Corbalis et al. | 370/94.2 |
| 5,280,470 A | 1/1994 | Buhrke et al. | 370/13 |
| 5,303,237 A | 4/1994 | Bergman et al. | 370/85.6 |
| 5,313,454 A | 5/1994 | Bustini et al. | 370/13 |
| 5,317,562 A | 5/1994 | Nardin et al. | 370/16 |
| 5,359,592 A | 10/1994 | Corbalis et al. | 370/17 |
| 5,408,472 A | 4/1995 | Hluchyj et al. | 370/94.1 |
| 5,485,455 A | 1/1996 | Dobbins et al. | 370/60 |
| 5,497,371 A | 3/1996 | Ellis et al. | 370/60 |
| 5,502,725 A | 3/1996 | Pohjakallio | 370/94.1 |
| 5,570,360 A | 10/1996 | Klausmeier et al. | 370/60 |
| 5,570,361 A | 10/1996 | Norizuki et al. | 370/60.1 |
| 5,598,581 A | 1/1997 | Daines et al. | 395/872 |
| 5,610,910 A | 3/1997 | Focsaneanu et al. | 370/351 |
| 5,699,521 A | 12/1997 | Iizuka et al. | 395/200.15 |
| 5,734,654 A | 3/1998 | Shirai et al. | 370/396 |
| 5,737,635 A | 4/1998 | Daines et al. | 395/872 |
| 5,765,032 A | 6/1998 | Valizadeh | 395/200.65 |
| 5,778,182 A | 7/1998 | Cathey et al. | 395/200.49 |
| 5,793,978 A | 8/1998 | Fowler | 395/200.56 |
| 5,805,595 A | 9/1998 | Sharper et al. | 370/442 |
| 5,828,653 A | 10/1998 | Goss | 370/230 |
| 5,835,494 A | 11/1998 | Hughes et al. | 370/397 |
| 5,835,727 A | 11/1998 | Wong et al. | 395/200.68 |
| 5,838,683 A | 11/1998 | Corley et al. | 370/408 |
| 5,850,399 A | 12/1998 | Ganmukhi et al. | 370/412 |
| 5,922,051 A | 7/1999 | Sidey | 709/223 |
| 5,926,458 A | 7/1999 | Yin | 370/230 |
| 5,959,990 A | 9/1999 | Frantz et al. | 370/392 |
| 5,970,477 A | 10/1999 | Roden | 705/32 |
| 6,035,281 A | 3/2000 | Crosskey et al. | 705/14 |
| 6,101,531 A | 8/2000 | Eggleston et al. | |
| 6,119,160 A | 9/2000 | Zhang et al. | 709/224 |
| 6,154,776 A | 11/2000 | Martin | |
| 6,188,698 B1 | 2/2001 | Galand et al. | 370/412 |
| 6,205,149 B1 | 3/2001 | Lemaire et al. | 370/401 |
| 6,256,309 B1 | 7/2001 | Daley et al. | 370/395 |
| 6,259,699 B1 | 7/2001 | Opalka et al. | 370/398 |
| 6,278,701 B1 | 8/2001 | Ayyagari et al. | |
| 6,282,575 B1 | 8/2001 | Lin et al. | |
| 6,292,465 B1 | 9/2001 | Vaid et al. | |
| 6,466,976 B1 | 10/2002 | Alles et al. | |
| 6,502,131 B1 | 12/2002 | Vaid et al. | |
| 6,917,617 B2 * | 7/2005 | Jin et al. | 370/395.21 |

* cited by examiner

USE OF PRECEDENCE BITS FOR QUALITY OF SERVICE

CROSS REFERENCE TO RELATED APPLICATIONS OR PRIORITY CLAIM

This application is a continuation of U.S. patent application Ser. No. 09/215,630, entitled "Use of Precedence Bits For Quality of Service", filed on Dec. 16, 1998 now U.S. Pat. No. 6,917,617, in the name of the same inventor and assigned to the same assignee.

BACKGROUND OF THE INVENTION

1. Field of the Invention

The present invention relates to the field of data communications networks. More particularly, this invention relates to a method and apparatus for implementing a quality of service (QoS) policy in a data communications network so as to thereby prioritize network traffic into a plurality of service levels and provide preferential treatment of different classes of data traffic on the data communications network. A number of priority levels may be implemented in accordance with the invention.

2. The Background

This invention relates to switched packet data communications networks. There are a number of different packet types which are used in modern switched packet data communications networks.

FIG. 1A depicts a generic packet 8 using Layer 2 encapsulation. A number of different Layer 2 encapsulation protocols are recognized. Each includes a MAC (media access control) destination address 10 and a MAC source address 12. The data 14 may include Layer 3 encapsulated packet information. A CRC (cyclic redundancy check) 16 is also provided at the end of the Layer 2 encapsulation. The unlabeled block 18 may include an Ethernet type for Ethernet V 2.0 (ARPA) packets. The Ethernet type may include IPv4 (IP) (in the future, IPv6), IPX, AppleTalk, DEC Net, Vines IP/Vines Echo, XNS, ARP or RARP. Other known encapsulations include SAP, SAP1, SNAP and the like. The meaning of the bits in block 18 differs among the different encapsulation protocols. This information is sometimes referred to as the Layer 2 Flow Information.

FIG. 1B depicts a typical IP packet (Layer 3) structure. The IP packet format is presently one of the most common Layer 3 packet types. The fields of importance to this disclosure are the "ToS value" or type of service 26 which is a preferably 8-bit field also known as Differentiated Services ("DS"), "prot-typ" or IP protocol type 28 (typically either TCP (transmission control protocol) or UDP (user datagram protocol), the Source IP address 30 (usually the IP address of the originating station), the Destination IP address 32 (usually the IP address of the ultimate destination station), the Layer 4 source port number 34 (available for TCP and UDP packets only) and the Layer 4 destination port number 36 (available for TCP and UDP packets only). The Layer 4 flow information may be used to identify a particular packet flow as being the product of (source port) or directed to (destination port) a particular application. The ToS/Differentiated Services field is used by routers of the data communications network to provide priority/delay/dropping services.

As the use of data communications networks increases worldwide, congestion of those networks has become a problem. A given data communications network, a given node on a data communications network, or a given link connecting two nodes has a certain capacity to pass data packets and that capacity cannot be exceeded. When data traffic on the data communications network becomes heavy enough that one can anticipate congestion problems which might lead to packets being dropped, it is desirable to implement a "Quality of Service" or QoS policy so as to give priority to certain types of traffic and/or customers so as not to drop their packets, thus assuring that critical communications are able to pass through the data communications network and/or providing a guaranteed service level, albeit at the expense of less critical communications.

The QoS level mapped into the ToS/Differentiated Services precedence bits (or other bits of the packet) is used by devices such as routers, gateways and switches within a data communications network in a number of ways. For example, packet rate limiting may be imposed to cap a user's throughput of packets to a given contract level specified in a service agreement with the user. In this way limited system services may not be over-used by those paying the least for those services. In another example, packet rate limiting may be imposed under congested network conditions to drop or modify packets based, at least in part, upon the QoS level associated with the packet. Those with a "higher" QoS level will do better in getting their communications through in congested conditions than those with a "lower" QoS level.

One way in which the ToS bits of the IP header are presently used is to use edge routers 38 as shown in FIG. 2 to interface between users 40 and core routers 42, 44, 46. In accordance with this approach the edge routers are used to set the ToS precedence bits (the highest order three bits of the eight-bit ToS/Differentiated Services field) based upon the source IP address of the packet. While this can be effective in some environments, it is rather inflexible since it is based solely on pre-programmed IP addresses and creates administrative burdens in programming all of the edge routers. It is also ineffective in handling many types of roaming users and/or users with dynamically assigned IP addresses such as those obtained or leased from DHCP (dynamic host control protocol) servers.

Accordingly, a need exists for a QoS system which can provide for the QoS needs of roaming or DHCP users while simplifying the task of programming QoS levels associated with the user. Furthermore, it would be desirable to provide a QoS system that provides on-demand QoS rather than a fixed QoS for each user to better accommodate the shifting needs of users.

SUMMARY OF THE INVENTION

Certain bits of a packet, such as bits in the IP header of an IP packet, are used to designate the type of service or Quality of Service (QoS) level to be afforded to the packet as it passes through a data communications network. A user entitled to a certain QoS level logs into a service selection gateway SSG. The SSG queries an authentication, authorization and accounting (AAA) server in response to a log-in attempt by the user. Upon authorization, the AAA server returns an access accept signal in addition to an indication from the user's service profile (user profile) as to the QoS level to be afforded the user. While the user is logged in, all packets are routed through the SSG. The SSG sets the certain bits of the packet in accordance with the user's assigned QoS level so that as the packets are routed through the data communications network, they are consistently afforded the assigned Quality of Service level. In another aspect of the invention, on-demand QoS may be provided by the SSG and accounted for by communications with the AAA server.

DETAILED DESCRIPTION OF A PREFERRED EMBODIMENT

Figure 1A:
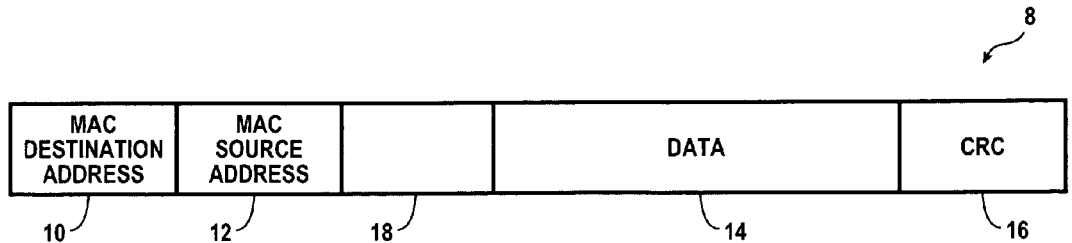
FIG. 1A is a diagram showing the structure of a typical Ethernet packet.
Figure 1B:
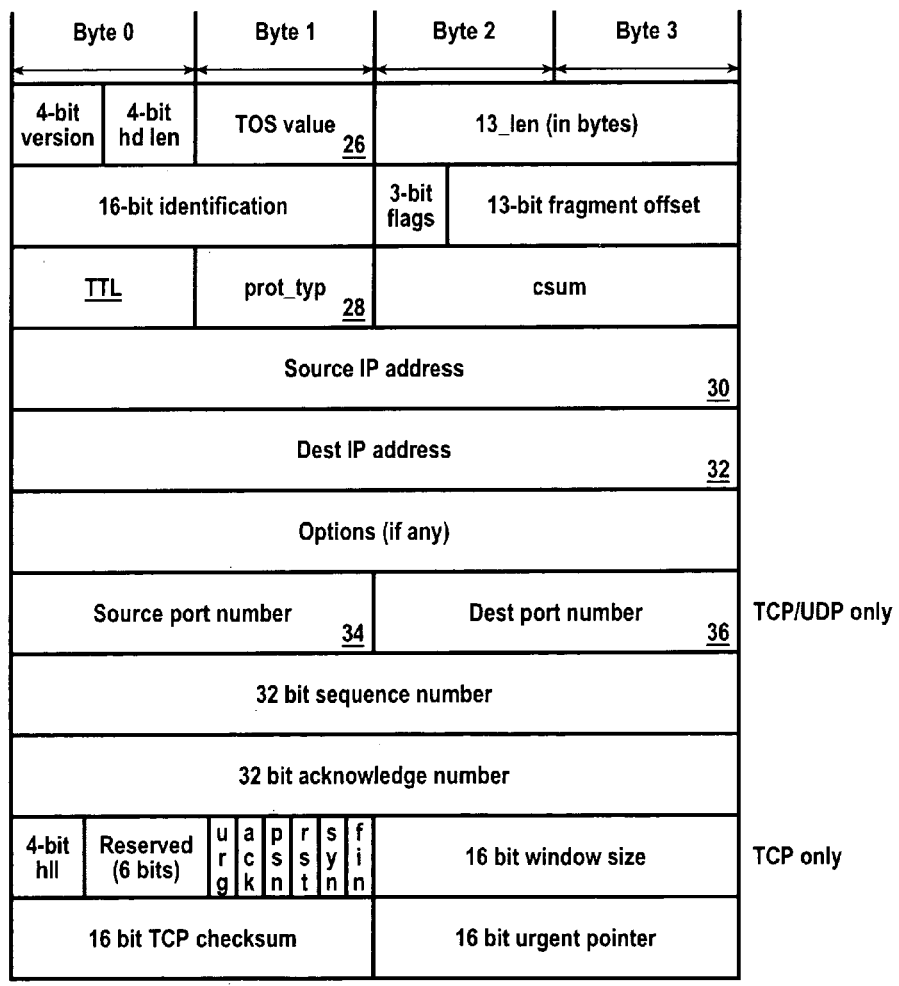
FIG. 1B is a diagram showing the basic structure of a Layer 3 IP packet.
Figure 2:
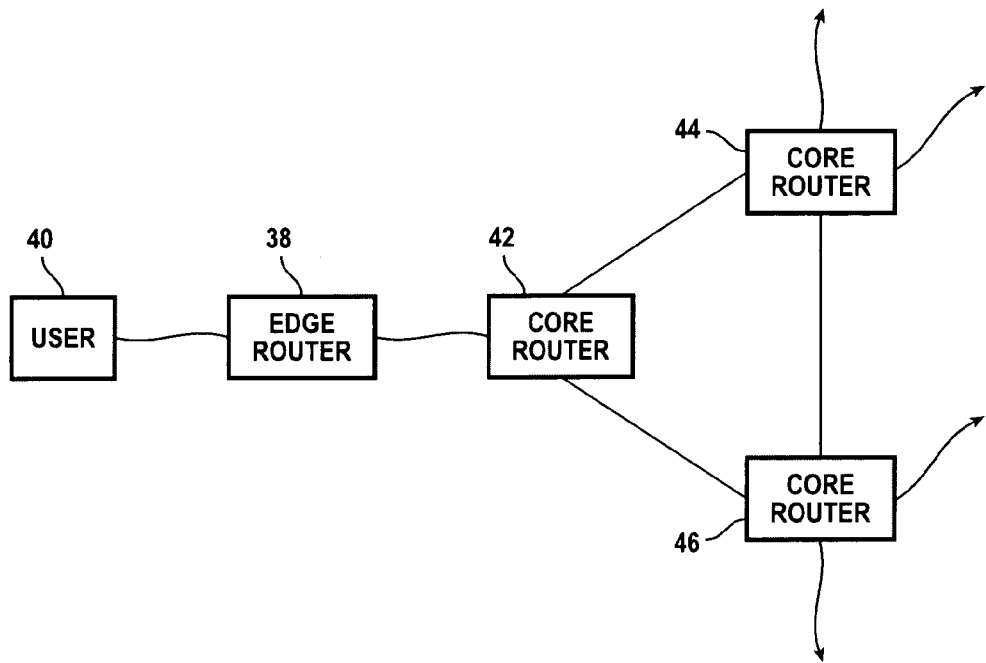
FIG. 2 is a system block diagram of a typical network interface to a user.

Those of ordinary skill in the art will realize that the following description of the present invention is illustrative only and not in any way limiting. Other embodiments of the invention will readily suggest themselves to such skilled persons after a perusal of the within disclosure.

In accordance with a presently preferred embodiment of the present invention, the components, processes and/or data structures are implemented using a gateway device implemented using C++ programs running on an Enterprise 2000™ server running Sun Solaris™ as its operating system. The Enterprise 2000™ server and Sun Solaris™ operating system are products available from Sun Microsystems, Inc. of Mountain View, Calif. Different implementations may be used and may include other types of operating systems, computing platforms, computer programs, firmware and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

In accordance with a presently preferred embodiment of the present invention, the three Precedence bits (the three highest order or most significant bits of the 8-bit Type of Service (ToS)/Differentiated Services field 26 of the IP packet header) are used to designate the type of service or Quality of Service (QoS) level to be given to packets sourced from a particular user. Those of ordinary skill in the art will realize that the particular bits used are not particularly critical, for example, the CoS (Class of Services) bits of an IEEE 802.1q encapsulated frame could be used as could the CoS bits in an ISL frame. Other bits or fields could also be designated to carry the QoS level information. A 3-bit ToS permits up to 8 levels of service. Initially, more than three bits could be used, if desired.

The present invention makes use of a user's service profile. A service profile, sometimes referred to as a user profile, contains information relating to a particular user's network access account. For example, it may include an identification of the user's last known home PoP (point of presence) or home gateway located in a PoP. It may include the identification of one or more domain name server(s) (DNS) to use in resolving domain names to IP addresses. It may include details about the user's service agreement with the ISP (internet service provider) servicing the user's account. Such information may include an identification of the QoS level to be provided to the user. For example, if the user is a "Platinum" user, he or she might receive a level 8 ToS thus granting his/her packets the best service. A normal user not paying a premium for a higher QoS might be afforded a level 1 ToS.

The user profile is stored in AAA (authentication, authorization and accounting) servers disposed in various locations in the data communications network.

The authentication, authorization and accounting (AAA) server performs user authentication, user authorization and user accounting functions. It may be a Cisco ACS or product such as Cisco Secure, available from Cisco Systems, Inc. of San Jose, Calif., or an equivalent product. In accordance with a presently preferred embodiment of the present invention, the Remote Authentication Dial-In User Service (RADIUS) protocol is used as the communication protocol between the service selection gateway and the AAA server. RADIUS is an Internet standard track protocol for carrying authentication, authorization, accounting and configuration information between a gateway device that desires to authenticate its links and a shared AAA server. Those of ordinary skill in the art will realize that other Internet protocols such as TACSCS+ can be used as acceptable authentication communications links between the various communications devices that encompass the data communications network and still be within the inventive concepts disclosed herein.

The service selection gateway (SSG) is a device which couples the user to the data communications network. The user may log directly into the service selection gateway or may do so via an intermediate server such as a network access server. The term gateway is not meant to be limited to a single type of device, as any device, hardware or software, that may act as a bridge between the user and the network may be considered a gateway for the purposes of this application. In accordance with a presently preferred embodiment of the present invention, the service selection gateway is a model 6510 service selection gateway available from Cisco Systems, Inc. of San Jose, Calif.

Figure 3:
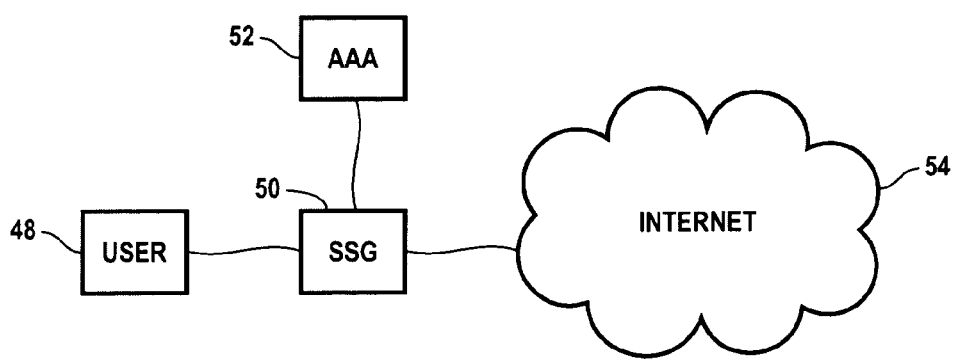
FIG. 3 is a system block diagram of a data communications network in accordance with a presently preferred embodiment of the present invention.

Turning now to FIG. 3, when the user 48 logs-in to the SSG 50, either directly or through one or more intermediate devices, the SSG 50 obtains the user's service profile from an AAA server 52. The user profile will contain an additional field detailing the QoS level to be afforded the user in accordance with a presently preferred embodiment of the present invention. The SSG 50 stores the QoS level associated with the user in a local memory or cache associated with the user and, in effect, acts as an edge router for the user in all subsequent outbound communications forwarded to the Internet 54 or other data communications network during the session. The SSG 50 simply replaces the ToS/Differentiated Services with a bit pattern corresponding to the user's QoS level.

This approach provides a number of important advantages. First, the QoS level for the user need only be set once in establishing the user's service profile. The existing AAA system will assure that the user's service profile is available regardless of the PoP that the user logs-in on. This means that roaming users will be supported where they could not easily be supported in the edge router system approach. Second, maintaining and modifying the QoS level associated with a user is quite simple—simply modify the user service profile once. Third, this approach allows implementation of a pay-per-use approach to QoS where a user may negotiate with an SSG to obtain a particular QoS level that the user would not otherwise receive to cover a particular session or one or more particular flows within a session. This could be used where a user desires to send time critical communications such as voice over IP or video over IP where dropouts are distracting and undesirable. In such a case, the user could be billed or in some way charged for the use, if desired. The SSG in conjunction with the AAA server can effectively track the user's use of the on-demand service and send RADIUS (or equivalent) packets to the AAA server. A number of billing and use schemes can now be implemented that were unavailable under the edge router system.

Figure 4:
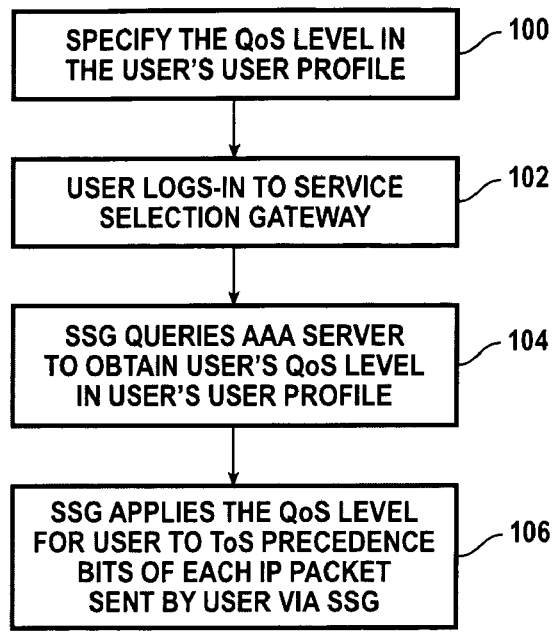
FIG. 4 is a flow diagram of a first method of setting QoS for an IP packet in accordance with one embodiment of the present invention.

Turning now to FIG. 4, a method in accordance with one embodiment of the present invention is described. At reference numeral 100 the QoS level to be afforded all packets sent by the user is set in the user profile of the user. This is stored in AAA servers preferably distributed about the data communications network.

At reference numeral 102 the user attempts log-in at a PoP containing a service selection gateway—either directly or through a network access server or other intermediate server.

At reference numeral 104 the SSG queries an AAA server using the RADIUS (or an equivalent) protocol and obtains the QoS level specified in the user's service profile.

At reference numeral 106 the SSG applies the QoS level for the user by setting the ToS precedence bits of each IP packet sent by the user to the QoS value specified in the user's service profile or to a direct mapping of that value. Note that QoS level may be implemented using other bits in the packet as would be apparent to those of ordinary skill in the art.

Figure 5:
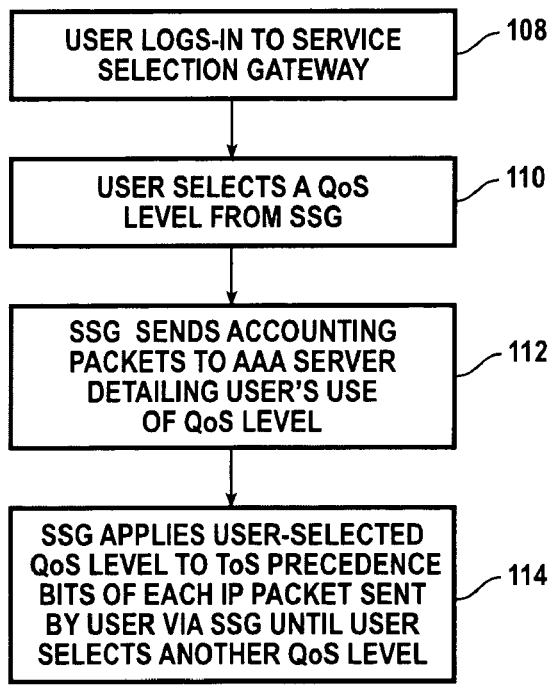
FIG. 5 is a flow diagram of a second method of setting QoS for an IP packet in accordance with another embodiment of the present invention.

The above procedure describes a "subscription"-based QoS approach. A different "pay-per-use" QoS approach is detailed in FIG. 5.

At reference numeral 108 the user attempts log-in at a PoP containing a service selection gateway—either directly or through an intermediate network access server or other intermediate device.

At reference numeral 110 the user signals the SSG of a selected QoS level to use. This may be for all packets sent during the session, for all packets sent during the session of a particular protocol type or from or to a particular Layer 4 port number (e.g., voice over IP might be set to a higher QoS than standard traffic) and the like. This can be accomplished through a conventional menuing system, through a dashboard application program in communication with the SSG and/or through direct command to the SSG.

At reference numeral 112 and SSG optionally sends accounting packets detailing the user's use of the QoS level within the data communications network so that pay-per-use may be realized.

At reference numeral 114 the SSG applies the user selected QoS levels to selected packets in accordance with policy set by the user to the ToS precedence bits of the ToS field of IP packets sent by the user. This happens until the user selects another QoS level or logs-out.

Alternative Embodiments

While embodiments and applications of the invention have been shown and described, it would be apparent to those of ordinary skill in the art, after a perusal of the within disclosure, that many more modifications than mentioned above are possible without departing from the inventive concepts herein. The invention, therefore, is not to be restricted except in the spirit of the appended claims.

What is claimed is:

1. A method for setting Quality of Service (QoS) bits of packets sent by a user of a data communications network, the method comprising:

obtaining a user service profile including a QoS level for the user in response to a user log-in attempt to a service selection gateway (SSG), the QoS level being associated with the user regardless of a point of presence (PoP) at which the user attempts to log in;

routing all packets originated by the user through the SSG during a session;

setting, in the SSG, the QoS bits of packets originated by the user in accordance with the QoS level for the user; and passing, after the QoS bits have been set, the packets on to the data communications network.

2. The method of claim 1, wherein all packets transmitted by the user have QoS bits set in accordance with QoS level for the user.

3. The method of claim 1, further comprising:

storing the QoS level in a local memory associated with the user.

4. The method of claim 1, further comprising:

sending the user log-in attempt to the SSG either directly or via an intermediate server.

5. The method of claim 1, wherein the intermediate server is a network access server (NAS).

6. A method for setting Quality of Service (QoS) bits of packets sent by a user of a data communications network, the method comprising:

initiating a request to an authentication, authorization and accounting (AAA) server in response to the user's attempt to log in;

receiving, from the AAA server, a user service profile corresponding to the user, the user service profile including a Quality of Service field indicating a QoS level associated with the user regardless of a point of presence (PoP) at which the user attempts to log in; and using the Quality of Service field to set the QoS bits within the packets transmitted by the user.

7. The method of claim 6, wherein all packets transmitted by the user have QoS bits set in accordance with the Quality of Service field of the user.

8. The method of claim 6, further comprising:

storing the QoS level in a local memory associated with the user.

9. The method of claim 6, further comprising:

sending the user log-in attempt to the SSG either directly or via an intermediate server.

10. The method of claim 6, wherein the intermediate server is a network access server (NAS).

11. The method of claim 6, further comprising:

tracking the user's use of the QoS level; and sending to the AAA server accounting packets having information on the user's use of the QoS level within the data communications network.

12. A method for setting Quality of Service (QoS) bits of packets sent by a user of a data communications network, the method comprising:

receiving, at a service selection gateway (SSG) to which the user is in communication, a request from the user to assign a particular QoS level to at least one packet flow transmitted by the user;

assigning, in response to the request, a QoS level to the at least one packet flow and applying in the assigned QoS level until either the user requests another QoS level to use or the user logs out;

setting the QoS bits within the packets belonging to the at least one packet flow received at the SSG in accordance with the assigned QoS level; and transmitting the packets belonging to the at least one packet flow to the data communications network.

13. The method of claim 12, wherein all of the packets of the at least one packet flow are IP packets.

14. The method of claim 12, further comprising:
communicating between the service selection gateway and an AAA server the request.

15. The method of claim 12, further comprising:
providing with the user with a menu to select a QoS level using an application program.

16. The method of claim 12, wherein the receiving comprises:
receiving a command from the user.

17. The method of claim 12, further comparing:
tracking the user's use of the QoS level; and
sending to an authentication, authorization and accounting (AAA) server accounting packets having information on the user's use of the QoS level within the data communications network.

18. The method of claim 17, wherein all packets sent by the user during a session are assigned the requested QoS level.

19. The method of claim 17, wherein all packets sent by the user during a session of a particular protocol type are assigned the requested QoS level.

20. The method of claim 17, wherein all packets sent by the user during a session to or from a particular Layer 4 port are assigned the requested level.

21. An apparatus for setting Quality of Service (QoS) bits of packets sent by a user of a data communications network, the apparatus comprising:
a service selection gateway (SSG) in communication with the user, the SSG receiving a user service profile including a QoS level in response to an attempt to log in by the user, the QoS level being associated with the user regardless of the point of presence (PoP) at which the user attempts to log in; and
a packet modifier associated with the SSG, the packet modifier modifying the QoS bits of packets sent by the user to reflect the QoS level received for the user.

22. The apparatus of claim 21, wherein the packet modifier modifies all packets transmitted by the user to the data communications network via the SSG.

23. The apparatus of claim 22, wherein all modified packets are IP packets.

24. The apparatus of claim 21, wherein the packet modifier modifies packets belonging to at least one flow of packets transmitted by the user to the data communications network via the SSG.

25. The apparatus of claim 24, wherein all modified packets are IP packets.

26. An apparatus for setting Quality of Service (QoS) indicator bits of packets sent by a user of a data communications network, the apparatus comprising:
a service selection gateway (SSG) in communication with the user and the data communications network; and
a packet modifier associated with the SSG, responsive to a QoS request from the user to assign a particular QoS level, setting, in accordance with the requested QoS level, a QoS bit field of packets sent by the user to the data communications network via the SSG, wherein the packet modifier applies the assigned QoS level until either the user requests another QoS level to use or the user logs out.

27. The apparatus of claim 26, wherein the QoS bit field is set to a value specified in the QoS request.

28. The apparatus of claim 27, wherein the QoS bit field is set for all packets sent by the user to the data communications network via the SSG.

29. The apparatus of claim 27, wherein the QoS bit field is set for all packets sent by the user to the data communications network via the SSG which packets belong to at least one packet flow specified in the QoS request.

30. The apparatus of claim 26, wherein the SSG is configured to receive the QoS request from an application program configured to provide the user with a menu to select a QoS level.

31. The apparatus of claim 26, wherein the SSG is configured to receive the QoS request as a command sent directly from the user.

32. The apparatus of claim 26, wherein the packet modifier is configured to apply the assigned QoS level until either the user requests another QoS level to use or the user logs out.

33. A system for setting Quality of Service (QoS) bits of packets sent by a user of a data communications network, the system comprising:
an authentication, authorization and accounting (AAA) server maintaining a user service profile including a QoS level for the user;
a service selection gateway (SSG) in communication with the user and the AAA server, the SSG receiving the user profile of the user in response to the user's attempt to log in; and
a packet modifier associated with the SSG, the packet modifier modifying the QoS bits of packets sent by the user to reflect the QoS level specified in the received user profile.

34. The system of claim 33, wherein the QoS level is associated with the user regardless of a point of presence (PoP) at which the user attempts to log in.

35. A system for setting Quality of Service (QoS) bits of packets sent by a user of a data communications network, the system comprising:
an authentication, authorization and accounting (AAA) server maintaining a user profile;
a service selection gateway (SSG) in communication with the user and the AAA server, the SSG configured to receive a QoS request by the user to assign a particular QoS level to at least one packet flow transmitted by the user; and
a packet modifier associated with the SSG, the packet modifier configured to modify the QoS bits of packets sent by the user to reflect the requested QoS level.

36. The system of claim 35, wherein the SSG is configured to receive the QoS request sent via an application program providing with the user with a menu to select a QoS level.

37. The system of claim 35, wherein the SSG is configured to receive a command to set a QoS level directly from the user.

38. The system of claim 35, wherein the packet modifier is configured to apply the particular QoS level until either the user requests another QoS level to use or the user logs-out.

39. The system of claim 35, wherein the SSG is configured to track the user's use of the QoS level, and send to the AAA server accounting packets having information on the user's use of the QoS level within the data communications network.

40. A method for implementing Quality of Service (QoS) levels in a data communications network, the method comprising:
maintaining, in an authentication, authorization and accounting (AAA) server, a user service profile including a QoS level associated with a user;
obtaining the user service profile from the AAA server in response to a user log-in attempt to a service selection gateway (SSG);
routing all packets originated by the user through the SSG during a session;

setting, in the SSG, QoS bits of the packets originated from the user in accordance with the QoS level for the user; and passing, after the QoS bits have been set, the packets on to the data communications network.

41. The method of claim 40, further comprising:
modifying a QoS field of the user service profile in response to a request from the user so as to modify the QoS level associated with the user.

42. The method of claim 40, further comprising:
tracking the user's use of the QoS level; and
sending to the AAA server accounting packets having information on the user's use of the QoS level within the data communications network.

43. A method for implementing Quality of Service (QoS) levels in a data communications network, the method comprising:
maintaining, in an authentication, authorization and accounting (AAA) server, a user service profile including information regarding a QoS level associated with a user;
receiving, at a service selection gateway (SSG) to which the user is in communication, a request from the user to assign a particular QoS level to at least one packet flow transmitted by the user;
assigning, in response to the request, the QoS level to the at least one packet flow in a session;
setting QoS bits within packets belonging to the at least one packet flow received at the SSG in accordance with the assigned QoS level;
transmitting the packets belonging to the at least one packet flow to the data communications network; and
sending to the AAA server accounting packets having information on the user's use of the QoS level within the data communications network.

44. The method of claim 43, further comprising:
applying the particular QoS level until either the user requests another QoS level to use or the user logs out.

45. The method of claim 43, wherein the at least one packet flow is user-selected.

46. The method of claim 43, wherein all packets sent by the user during a session are assigned with the requested QoS level.

47. The method of claim 43, wherein all packets sent by the user during a session of a particular protocol type are assigned with the requested QoS level.

48. The method of claim 43, wherein all packets sent by the user during a session to or from a particular Layer 4 port are assigned with the requested QoS level.

49. The method of claim 43, further comprising:
providing with the user a menu to select a QoS level using an application program.

50. The method of claim 43, wherein the receiving comprises:
receiving a command directly from the user.

51. A method for implementing Quality of Service (QoS) levels in a data communications network, the method comprising:
establishing a user service profile including a QoS level associated with a user;
maintaining the user service profile in an authentication, authorization and accounting (AAA) server;
obtaining the user service profile from the AAA server in response to a user log-in attempt to a service selection gateway (SSG);
setting, in the SSG, QoS bits of the packets originated from the user in accordance with the QoS level for the user;
routing, after the QoS bits have been set, the packets on to the data communications network;
sending to the AAA server accounting packets having information on the user's use of the QoS level within the data communications network; and
charging the user in accordance with the use of the QoS level.

52. A method in accordance with claim 51, further comprising:
modifying a QoS field of the user service profile in response to a request from the user so as to modify the QoS level associated with the user.

53. A method for implementing Quality of Service (QoS) levels in a data communications network, the method comprising:
establishing a user service profile including information regarding a QoS level associated with a user;
maintaining the user service profile in an authentication, authorization and accounting (AAA) server;
receiving, at a service selection gateway (SSG) to which a user is in communication, a request from the user to assign a particular QoS level to at least one packet flow transmitted by the user;
assigning, in response to the request, the QoS level to the at least one packet flow in a session;
setting QoS bits within packets belonging to the at least one packet flow received at the SSG in accordance with the assigned QoS level;
transmitting the packets belonging to the at least one packet flow to the data communications network;
sending to the AAA server accounting packets having information on the user's use of the QoS level within the data communications network; and
charging the user in accordance with the use of the QoS level.

54. The method of claim 53, further comprising:
applying the particular QoS level until either the user requests another QoS level to use or the user logs out.

55. The method of claim 53, wherein all packets sent by the user during a session are assigned the requested QoS level.

56. The method of claim 53, wherein all packets sent by the user during a session of a particular protocol type are assigned the requested QoS level.

57. The method of claim 53, wherein all packets sent by the user during a session to or from a particular Layer 4 port are assigned the requested QoS level.

58. The method of claim 53, further comprising:
providing the user with a menu to select a QoS level using an application program.

59. The method of claim 53, wherein the receiving comprises:
receiving a command directly from the user.

60. An apparatus for setting Quality of Service (QoS) bits of packets sent by a user of a data communications network, the apparatus comprising:
means for obtaining a user service profile including a QoS level for the user in response to a user log-in attempt to a service selection gateway (SSG), the QoS level being associated with the user;
means for routing all packets originated by the user through the SSG during a session;
means for setting, in the SSG, the QoS bits of packets originated by the user in accordance with the QoS level for the user; and
means for passing after the QoS bits have been set, the packets on to the data communications network.

61. The apparatus of claim 60, wherein the QoS level is associated with the user regardless of a point of presence (PoP) at which the user attempts to log in.

62. An apparatus for setting Quality of Service (QoS) bits of packets sent by a user of a data communications network, the apparatus comprising:
means for initiating a request to an authentication, authorization and accounting (AAA) server in response to the user's attempt to log in;
means for receiving, from the AAA server, a user service profile corresponding to the user, the user service profile including a Quality of Service field; and
means for using the Quality of Service field to set the QoS bits within the packets transmitted by the user.

63. The apparatus of claim 62, wherein the QoS level is associated with the user regardless of a point of presence (PoP) at which the user attempts to log in.

64. The apparatus of claim 62, further comparing:
means for tracking the user's use of the QoS level; and
means for sending to the AAA server accounting packets having information on the user's use of the QoS level within the data communications network.

65. An apparatus for setting Quality of Service (QoS) bits of packets sent by a user of a data communications network, the apparatus comprising:
means for receiving, at a service selection gateway (SSG) to which the user is in communication, a request from the user to assign a particular QoS level to at least one packet flow transmitted by the user;
means for assigning, in response to the request, a QoS level to the at least one packet flow;
means for setting the QoS bits within the packets belonging to the at least one packet flow received at the SSG in accordance with the assigned QoS level; and
means for transmitting the packets belonging to the at least one packet flow to the data communications network.

66. The apparatus of claim 65, wherein the means for receiving comprises:
means for receiving the QoS request via an application program providing the user with a menu to select a QoS level.

67. The apparatus of claim 65, wherein the means for receiving comprises:
means for receiving a command directly from the user.

68. The apparatus of claim 65, further comprising:
means for applying the particular QoS level until either the user requests another QoS level to use or the user logs out.

69. The apparatus of claim 65, further comprising:
means for tracking the user's use of the QoS level; and
means for sending to an authentication, authorization and accounting (AAA) server accounting packets having information on the user's use of the QoS level within the data communications network.

70. The apparatus of claim 69, wherein all packets sent by the user during a session are assigned the requested QoS level.

71. The apparatus of claim 69, wherein all packets sent by the user during a session of a particular protocol type are assigned the requested QoS level.

72. The apparatus of claim 69, wherein all packets sent by the user during a session to or from a particular Layer 4 port are assigned the requested QoS level.

73. The apparatus of claim 65, further comprising:
means for communicating the request between the service selection gateway and an AAA server.

74. An apparatus for implementing Quality of Service (QoS) levels in a data communications network, the apparatus comprising:
means for maintaining, in an authentication, authorization and accounting (AAA) server, a user service profile including a QoS level associated with a user;
means for obtaining the user service profile from the AAA server in response to a user log-in attempt to a service selection gateway (SSG);
means for routing all packets originated by the user through the SSG during a session;
means for setting, in the SSG, QoS bits of the packets originated from the user in accordance with the QoS level for the user; and
means for passing, after the QoS bits have been set, the packets on to the data communications network.

75. The apparatus of claim 74, further comprising:
means for modifying a QoS of filed the user service profile in response to a request from the user so as to modify the QoS level associated with the user.

76. The apparatus of claim 74, further comprising:
means for tracking the user's use of the QoS level; and
means for sending to the AAA server accounting packets having information on the user's use of the QoS level within the data communications network.

77. An apparatus for implementing Quality of Service (QoS) levels in a data communications network, the apparatus comprising:
means for maintaining, in an authentication, authorization and accounting (AAA) server, a user service profile including information regarding a QoS level associated with a user;
means for receiving, at a service selection gateway (SSG) to which the user is in communication, a request from the user to assign a particular QoS level to at least one packet flow transmitted by the user;
means for assigning, in response to the request, the QoS level to the at least one packet flow in a session;
means for setting QoS bits within packets belonging to the at least one packet flow received at the SSG in accordance with the assigned QoS level;
means for transmitting the packets belonging to the at least one packet flow to the data communications network; and
means for sending to the AAA server accounting packets having information on the user's use of the QoS level within the data communications network.

78. The apparatus of claim 77, further comprising:
means for applying the particular QoS level until either the user requests another QoS level to use or the user logs out.

79. The apparatus of claim 77, wherein the at least one packet flow is user-selected.

80. The apparatus of claim 77, wherein all packets sent by the user during a session are assigned the requested QoS level.

81. The apparatus of claim 77, wherein all packets sent by the user during a session of a particular protocol type are assigned the requested QoS level.

82. The apparatus of claim 77, wherein all packets sent by the user during a session to or from a particular Layer 4 port are assigned the requested QoS level.

83. The apparatus of claim 77, wherein the means for receiving comprises:
means for receiving the QoS request via an application program providing the user with a menu to select a QoS level.

84. The apparatus of claim 77, wherein the means for receiving comprises:
means for receiving a command directly from the user.

85. A program storage device readable by a machine, tangibly embodying a program of instructions executable by the machine to perform a method for setting Quality of Service (QoS) bits of packets sent by a user of a data communications network, the method comprising:
obtaining a user service profile including a QoS level for the user in response to a user log-in attempt to a service selection gateway (SSG), the QoS level being associated with the user regardless of a point of presence (PoP) at which the user attempts to log in;
routing all packets originated by the user through the SSG during a session;
setting, in the SSG, the QoS bits of packets originated by the user in accordance with the QoS level for the user; and
passing, after the QoS bits have been set, the packets on to the data communications network.

86. A program storage device readable by a machine, tangibly embodying a program of instructions executable by the machine to perform a method for setting Quality of Service (QoS) bits of packets sent by a user of a data communications network, the method comprising:
initiating a request to an authentication, authorization and accounting (AAA) server in response to the user's attempt to log in;
receiving, from the AAA server, a user service profile corresponding to the user, the user service profile including a Quality of Service field indicating a QoS level associated with the user regardless of a point of presence (PoP) at which the user attempts to log in; and
using the Quality of Service field to set, the QoS bits within the packets transmitted by the user.

87. A program storage device readable by a machine, tangibly embodying a program of instructions executable by the machine to perform a method for setting Quality of Service (QoS) bits of packets sent by a user of a data communications network, the method comprising:
receiving, at a service selection gateway (SSG) to which the user is in communication, a request from the user to assign a particular QoS level to at least one packet flow transmitted by the user;
assigning, in response to the request, a QoS level to the at least one packet flow and applying the assigned QoS level until either the user requests another QoS level to use or the user logs out;
setting the QoS bits within the packets belonging to the at least one packet flow received at the SSG in accordance with the assigned QoS level; and
transmitting the packets belonging to the at least one packet flow to the data communications network.

* * * * *